May. 21, 1940.   E. C. WHITNEY   2,201,658
CUTOFF MACHINE
Filed July 28, 1939   3 Sheets-Sheet 1
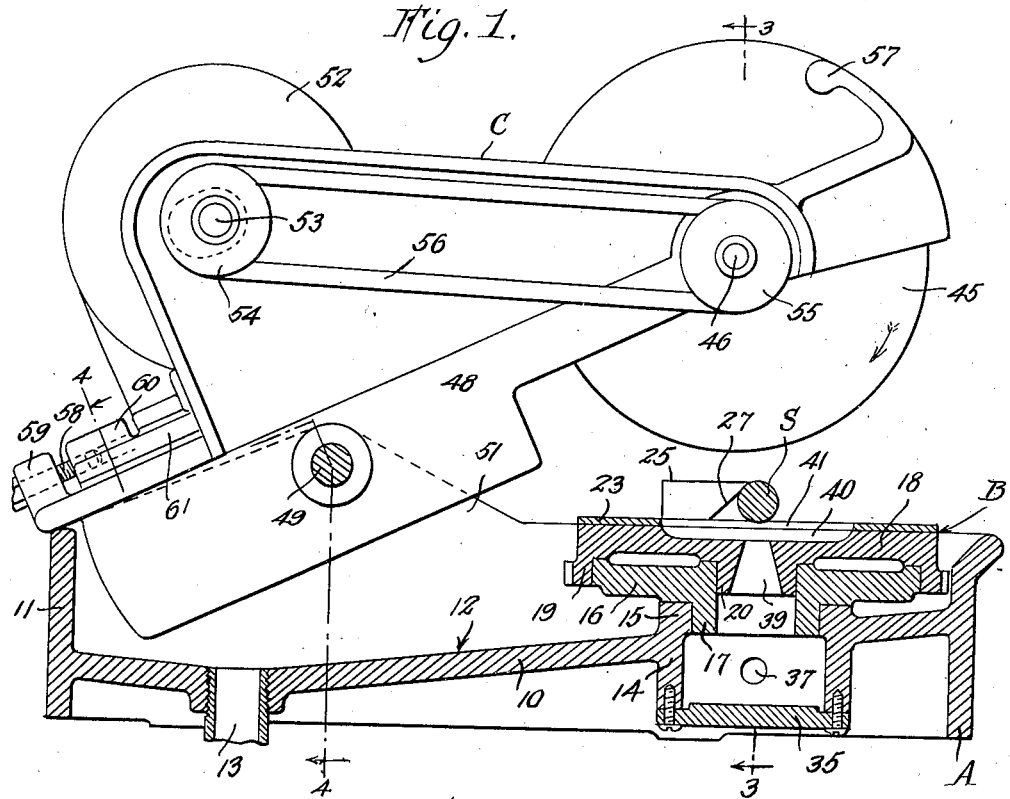
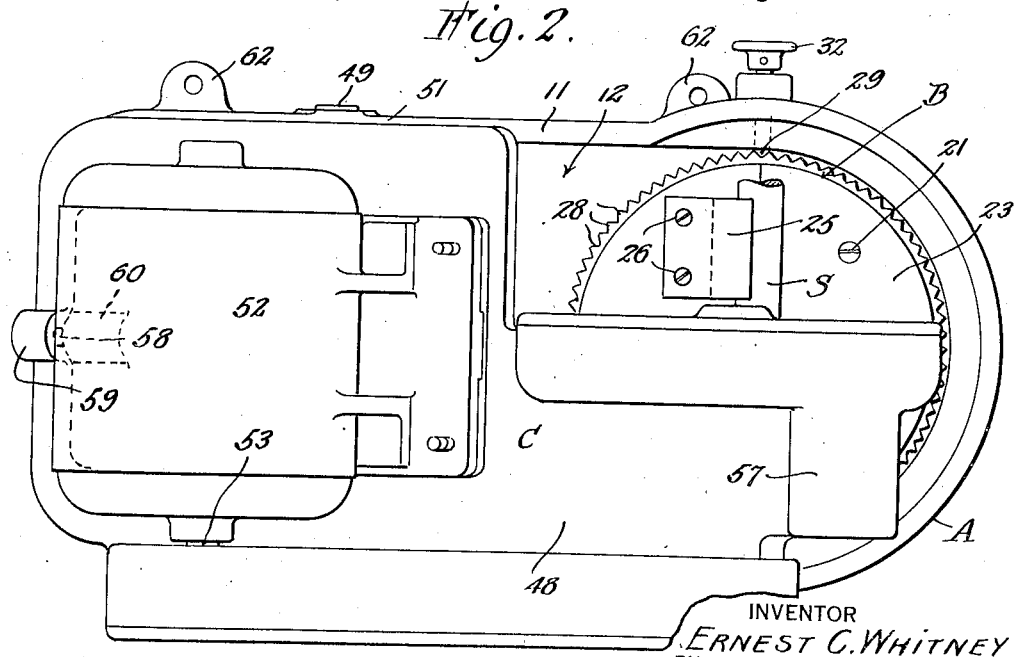
INVENTOR
ERNEST C. WHITNEY
BY
Clark + Ott
ATTORNEYS

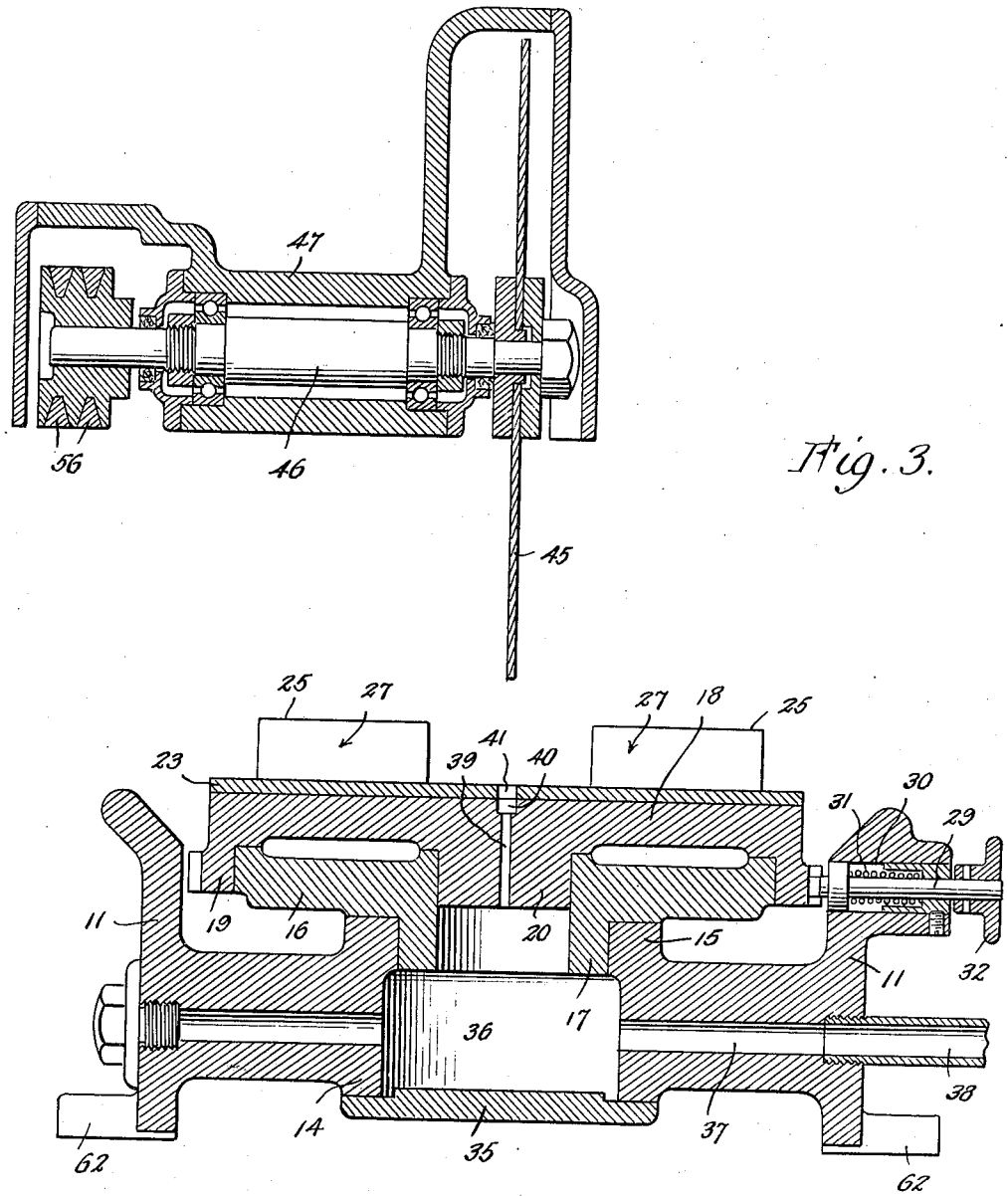

May 21, 1940.                E. C. WHITNEY                2,201,658
                              CUTOFF MACHINE
                           Filed July 28, 1939          3 Sheets-Sheet 3

INVENTOR
ERNEST C. WHITNEY
BY
Clark & Ott
ATTORNEYS

Patented May 21, 1940

2,201,658

UNITED STATES PATENT OFFICE 2,201,658

CUTOFF MACHINE

Ernest C. Whitney, Waterbury, Conn., assignor to Porter-McLeod Machine Tool Co., Inc., Hatfield, Mass., a corporation of Massachusetts Application July 28, 1939, Serial No. 286,969

7 Claims. (Cl. 164—60)

This invention relates to cutoff machines and has particular reference to an improved machine for cutting off metal, glass, ceramic and other stock and which is of the type wherein the stock and cutter are subjected to the action of a liquid coolant or lubricant so as to prevent overheating of the cutter and stock to thereby insure a clean cut and prevent discoloration of the stock while prolonging the life of the cutter.

The invention comprehends a machine of the indicated character which is so constructed and arranged as to subject the stock to the action of a liquid coolant or lubricant discharged upwardly against the underside thereof and in front of the portion to be cut and through which stream the cutter passes during the cutting operation so that some of the coolant is carried with the cutter into and through the cut to lubricate the cutting of the stock and to prevent overheating of the cutter and stock.

The invention further comprehends a turntable for the stock holder and stock which is mounted upon the bed of the machine and rotatably adjustable with respect thereto for disposing the stock at any desired angular position relative to the cutter and which turntable is provided with an axial port for directing a liquid stream upwardly against the underside of the stock irrespective of the position of the turntable and stock thereon.

The invention further provides a base including an upstanding peripheral rim and a bottom wall having a rearwardly inclined upper surface and provided with a drain outlet, said base forming a support for the turntable and defining a receptacle into which the liquid flows from the turntable and stock for drainage through the drain outlet.

The invention also includes a base of the indicated character provided with a liquid reservoir for supplying coolant which is directed upwardly through the center of the turntable.

The invention also includes a circular saw or abrasive wheel operatively connected with a motor for driving the same and which cutter and motor are mounted on a support mounted in bearings in the marginal rim of the base to normally dispose the saw or wheel above the turntable and to overbalance the saw or wheel so that the same automatically moves to an elevated position away from the stock when the same is released by the operator.

With the above enumerated and other objects in view the invention is set forth in greater detail in the following specification and illustrated in the accompanying drawings in which:

Figure 1 is a longitudinal sectional view through the base and work support of the cutoff machine with the cutter unit in side elevation and with the cutter in normally raised position.

Fig. 2 is a top plan view thereof.

Fig. 3 is an enlarged transverse vertical sectional view taken on the line 3—3 of Fig. 1.

Figure 4:
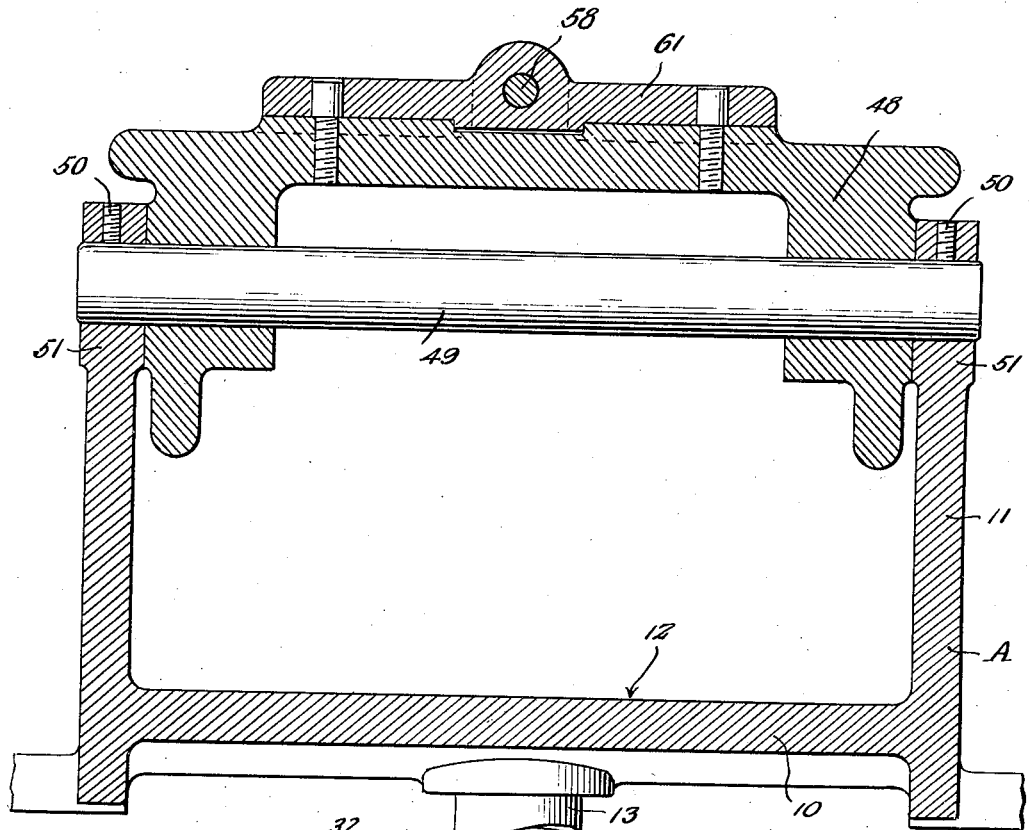
Fig. 4 is an enlarged transverse vertical sectional view taken approximately on the line 4—4 of Fig. 1.
Figure 5:
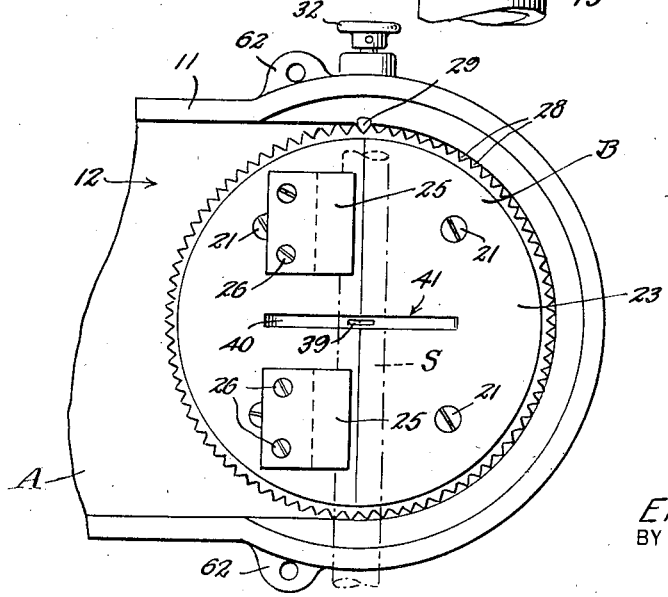
Fig. 5 is a fragmentary top plan view of the forward end of the base together with the stock support.

Referring to the drawings by characters of reference, A designates generally the base of the cutoff machine which is of elongated substantially rectangular formation in plan and includes a bottom wall 10 and an upstanding marginal wall 11. The upper surface 12 of the bottom wall inclines generally from one end of the base towards the other and is provided adjacent the lower end with a drain opening connected to and communicating with an outlet pipe 13. The base, adjacent the elevated end of the bottom wall, is provided with a hollow cylindrical boss 14, the lower portion of which depends from the bottom wall 10 and the upper portion of which protrudes above the upper surface thereof, and constitutes an annular bearing 15.

A work support, designated generally by the reference character B, is located within the base and is journaled in the bearing 15. The work support includes a lower disk 16 having a depending tubular journal 17 rotatably fitted within the bearing 15 and an upper disk 18 provided with a depending marginal rim 19 and a depending boss 20 having a force fit within the tubular journal 17. The disks 16 and 18 are secured together by suitable fastening means 21 and provide a turntable mounted upon the bearing 15 so as to turn with reference thereto.

The turntable is preferably provided with a sectional wear plate 23 secured to the upper surface thereof by the fastening means 21. A pair of stock holder blocks 25 are secured by suitable fastening means, such as anchoring screws 26, to the upper surface of the wear plate 23, the blocks being transversely spaced apart and provided with aligned undercut beveled faces 27 with which the stock S is engaged so as to position the same upon the wear plate to extend diametrically thereacross. The depending marginal rim 19 of the turntable disk 18 is provided with peripheral notches 28 which are selectively engageable by a retractible detent pin 29 slidably mounted in a lateral opening 30 in the upstanding rim 11 of the base. The detent pin is normally urged by a spring 31 into engagement with the notches of the turntable and is provided at its outer end with a manipulating knob 32 for manually retracting the detent pin. Under this arrangement the turntable may be rotatably adjusted to dispose the stock at any desired angular relation to the longitudinal axis of the base.

The hollow cylindrical boss 14 of the base A is provided with a bottom plate 35 which defines within the boss a reservoir 36 to which liquid is admitted through an inlet port 37 extending laterally through the base and connected to and communicating with a supply pipe 38.

The upper turntable disk 18 and its boss 20 are provided with an axially extending upwardly tapered liquid outlet port 39 which communicates with an elongated diametrically extending groove 40 in the upper surface of the disk 18 and with a corresponding outlet slot 41 in the wear plate 23 to define an outlet mouth for the liquid which underlies the stock and which is disposed perpendicular thereto.

The cutoff machine further embodies a cutter unit designated generally by the reference character C, which includes a rotary cutter 45 of any desired type such as an abrasive wheel, a circular saw or any equivalent cutting element. The cutter 45 is secured to a rotary shaft 46 journaled in a bearing 47 in the forward end of a pivoted frame 48 which frame is fulcrumed on a transverse shaft 49 secured by set screws 50 to upstanding bearings 51 at the opposite sides of the base A and integral with the marginal rim thereof.

The frame 48 has mounted thereon for longitudinal adjustment a motor 52 having a motor shaft 53 parallel to the cutter shaft 46. The motor shaft and cutter shaft are respectively provided with pulleys 54 and 55 around which are trained belts 56 for driving the cutter 45. The motor is so disposed on the frame 48 as to normally overbalance the cutter unit to elevate or raise the cutter 45 above the stock S, the rear portion of the frame engaging the upper edge of the marginal wall 11 so as to limit the overbalancing movement. The frame is provided at its forward end with a handle 57 which is adapted to be grasped for the purpose of lowering the cutter into engagement with the stock S.

A screw 58 extends through the lug 59 at the rear of the frame and threadedly engages a lug 60 on the base 61 of the motor to adjust the motor on the frame 48 for taking up any slack in the belts 56. The machine may be mounted on a bench or any other suitable support by means of the apertured lugs 62 formed on the base A.

In use and operation liquid which may be either a coolant or lubricant or both is supplied under pressure through the pipe 38 and inlet port 37 to the reservoir 36 whence it is directed upwardly through the tubular journal 17, the tapered outlet port 39 and the groove 40 and slot 41 defining the outlet mouth from which it is discharged in a stream upwardly against the underside of the stock and in front of the portion thereof being cut, while the cutter 45 passes through the stream during the cutting operation so that some of the liquid is carried with the cutter into and through the cut to cool and/or lubricate the stock and cutter for preventing overheating of the same. The liquid being discharged upwardly through the axial center of the turntable will act upon the stock and cutter irrespective of the relative angular positions of the stock and cutter.

The liquid after performing its function flows downwardly over the upper surface of the turntable and is trapped within the base where it is directed by the inclined upper surface 12 of the bottom wall 10 towards the drain outlet and conveyed off by means of the pipe 13. When desired the liquid may be recovered by returning the same through the pipe 13 to a sump from which the same is pumped and recirculated through the supply pipe 38 to the inlet port 37.

What is claimed is:

1. In a cutoff machine of the character described, a rotary cutter, a base including a bottom wall having an inclined upper surface and an upstanding peripheral rim, and a stock support carried by the base provided with means for directing a liquid stream upwardly against the underside of the stock and in front thereof in the path of the cutter during the cutting operation, and said bottom wall having an aperture in the lowest portion thereof for drainage of the liquid therefrom.

2. In a cutoff machine of the character described, a rotary cutter, a base and a rotatably adjustable stock support carried by the base, said stock support being axially apertured for directing a liquid stream upwardly therethrough irrespective of the position of the stock support.

3. In a cutoff machine of the character described, a rotary cutter, a base including a bottom wall having an inclined upper surface and an upstanding peripheral rim, a stock support, means carried by said bottom wall rotatably mounting the stock support and disposing the same within the confines of the peripheral rim and adjacent the top thereof, said stock support and said mounting means being axially apertured for receiving and directing a liquid stream upwardly through said stock support.

4. In a machine of the character described, a cutter, a base, a stock support carried by the base, said stock support being provided with means for directing a liquid stream upwardly therethrough, means carried by the stock support for locating the stock thereon above said stream, and means mounting said cutter for movement from a retracted position to a position engaging said stock and in the path of said stream.

5. In a machine of the character described, a cutter, a base including a bottom wall and an upstanding marginal rim, said bottom wall being provided with an upstanding apertured annular bearing, a support including upper and lower disks, said lower disk having a depending hub engaging said annular bearing and rotatably mounting said disk thereon, said upper disk being secured to the lower disk and said disks having aligned openings extending through said hub and the upper surface of said upper disk for directing liquid upwardly therethrough for discharge above the upper disk, said base and said marginal rim defining a receptacle into which the liquid is adapted to flow from the stock support, and means mounting said cutter for movement into the path of said stream.

6. In a machine of the character described, a cutter, a base including a bottom wall and an upstanding marginal rim, said bottom wall being provided with an upstanding apertured annular bearing, a work support including upper and lower disks, said lower disk having a depending hub engaging said annular bearing and rotatably mounting said disk thereon, said upper disk being secured to the lower disk and said disks having aligned openings extending through said hub and the upper surface of said upper disk for directing liquid upwardly therethrough for discharge above the upper disk, said base and said marginal rim defining a receptacle into which the liquid is adapted to flow from the stock support, a support for said cutter, and means carried by opposite portions of the marginal rim of the base swingably mounting said cutter to normally maintain the same in elevated position above the turntable and for manual swinging movement of the cutter into the path of said stream.

7. In a machine of the character described, a cutter, a base including a bottom wall and an upstanding marginal rim, said bottom wall being provided with an upstanding apertured annular bearing, a work support including upper and lower disks, said lower disk having a depending apertured hub engaging said annular bearing and rotatably mounting said disk thereon, said upper disk being secured to the lower disk and having a narrow elongated port opening diametrically through the upper surface thereof and communicating with the aperture of said hub for directing liquid upwardly therethrough for discharge above the upper disk, said base and said marginal rim defining a receptacle into which the liquid is adapted to flow from the stock support, and means swingably mounting said cutter in opposite portions of said marginal rim for movement into the path of said stream.

ERNEST C. WHITNEY.